Oct. 31, 1967  E. F. FLINT  3,350,562
INFRARED RADIOMETER HAVING A BLACK BODY REFERENCE SURFACE
AND A SPHERICAL CHOPPER
Filed Oct. 2, 1964
2 Sheets-Sheet 1

INVENTOR.
EDWARD F. FLINT
BY
ATTORNEY

INVENTOR.
EDWARD F. FLINT

ATTORNEY

United States Patent Office 3,350,562
Patented Oct. 31, 1967

3,350,562
INFRARED RADIOMETER HAVING A BLACK BODY REFERENCE SURFACE AND A SPHERICAL CHOPPER
Edward F. Flint, Fullerton, Calif., assignor to North American Aviation, Inc.
Filed Oct. 2, 1964, Ser. No. 401,126
4 Claims. (Cl. 250—83.3)

ABSTRACT OF THE DISCLOSURE

An infrared radiometer including a cavity having a black body reference surface, a radiation detector element located at one end of the cavity and a lens located at the opposite end of the cavity to focus infrared rays on the detector element. A spherical chopper is mounted for rotation around said cavity to alternately expose the detector to external radiation and to radiation from said black body reflected from the chopper.

---

This invention relates to an improved radiometer and more specifically to a radiometer utilizing a black body reference source for measuring infrared radiation.

The instruments employed in measuring infrared radiation, frequently expose a detector element to an external or unknown source of infrared and alternately expose the element to known source of infrared radiation such as a temperature controlled "black body." In so doing, the infrared radiation is measured by the difference between the reading of the unknown infrared source, and the reading of the known black body radiation. By employing this difference, an absolute reading is provided since the amount of radiation of the temperature controlled black body is known.

In the devices employing the above comparison of infrared radiation, a relatively flat shutter is employed to alternately provide black body radiation and external unknown radiation into the radiometer. As a result of the configuration of these shutters, the detector element, during the black body radiation period, sees a very large percentage of its own unstable radiation by reflection from the shutter. This, of course, unpredictably varies the amount of infrared radiation during the black body reflecting periods. This, of course, considerably decreases the accuracy of the black body as a known reference source and consequently decreases the accuracy of the radiometer. In addition, the conventional shutters and assemblies are quite large so as to restrict their use to certain limited applications.

Therefore, an object of the invention is to provide a new and improved radiometer which can measure infrared radiation with a high degree of accuracy.

A further object of the invention is the provision of an infrared radiometer which can provide an accurate measurement of the absolute quantity of infrared radiation.

Still a further object of the invention is to provide an infrared radiometer which provides an accurate measurement of the absolute value of infrared radiation and is relatively small and compact.

In order to accomplish the above objects, the radiometer of the present invention utilizes a known black body reference source and a chopper including a concave reflecting surface which rotates to alternately provide a concave reflecting surface between the black body and a detector and a transmitting opening to the detector for receiving infrared radiation from an external source. By utilizing such a reflecting surface, very little of the detector's own radiation is reflected back upon itself.

Figure 1:
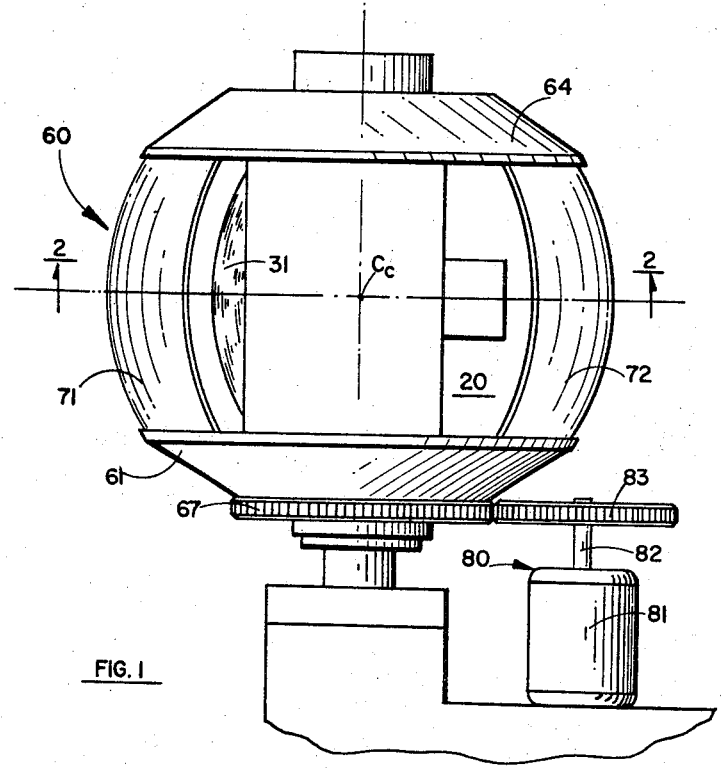
Figure 2:
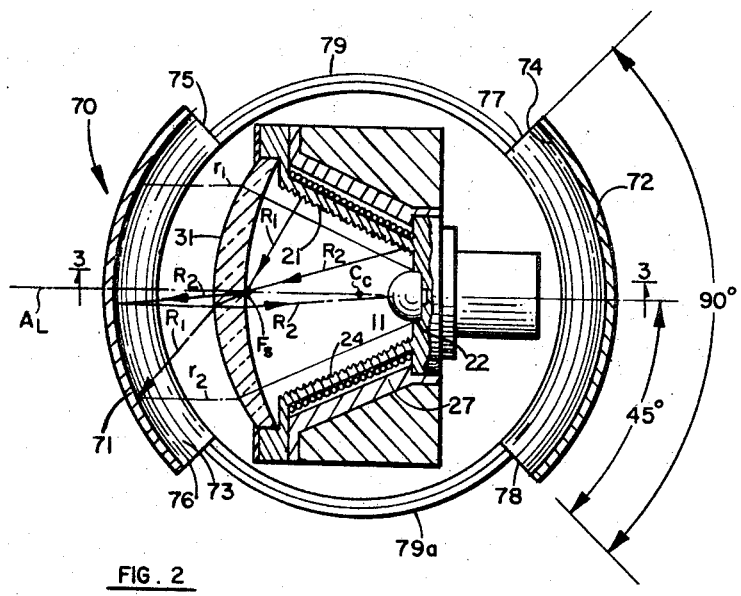
Figure 3:
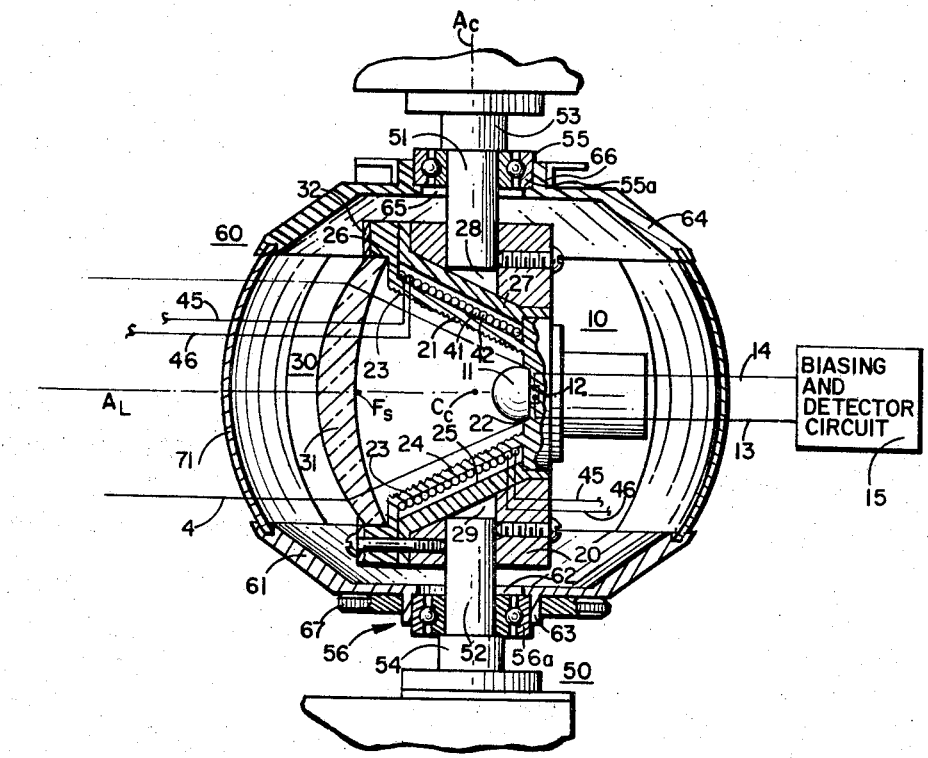
Figure 4:
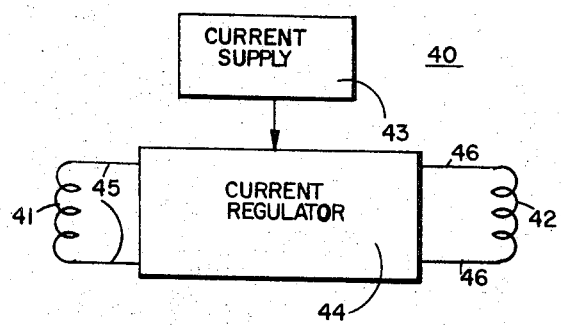
Figure 5:
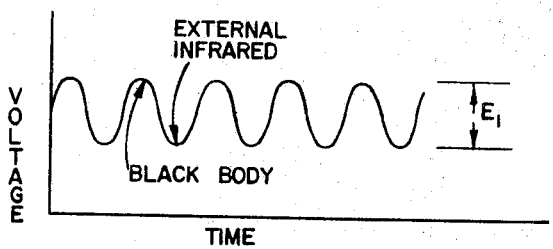

Other objects and advantages of the invention will become more apparent by reading of the following specification taken in connection with the accompanying drawings in which:

FIG. 1 illustrates an elevation view of a radiometer according to the invention;
FIG. 2 illustrates a cross-sectional view along lines 2—2 of FIG. 1;
FIG. 3 is a cross-sectional view taken along lines 3—3 of FIG. 2;
FIG. 4 is a schematic diagram in block form of a heater control circuit utilized in the embodiment shown in FIGS. 1, 2, and 3; and
FIG. 5 is a graph illustrating the output signal of the radiometer illustrated in FIGS. 1–4.

Briefly the embodiment illustrated in the drawigs comprises, as shown in FIG. 3, an infrared radiation detector assembly 10 which is mounted on a housing assembly 20 having a conically shaped black body reference surface with a relatively small circular aperture at one end and a relatively large circular aperture at the opposite end. The detector assembly 10 including a detector element is mounted in the relatively small aperture. In the embodiment illustrated in the drawings, a circular collimator lens or objective lens assembly 30 is mounted in the large circular aperture. A thermal control 40, shown in FIG. 4, is employed to maintain the black body reference surface at a constant temperature. A suitable mounting assembly 50, fixedly mounts the housing 20, the detector assembly 10 and the lens assembly 30 all of which are mounted within a rotatably mounted spherical chopper assembly 60. The chopper assembly 60 has diametrically disposed concave spherical shutter elements. These shutter elements operate to minimize the radiation detector elements reading back its own reflected radiation during the black body periods.

More specifically, the infrared radiation detector assembly 10 comprises, as shown in FIG. 3, a hyperhemispherical aplanatic lens 11 having a photosensitive detector element 12 mounted thereon. A suitable such detector is described in co-pending application Ser. No. 402,063, filed Oct. 2, 1964, in the name of Edward F. Flint and Robert Bruce Horsfall, Jr., entitled "Radiant Energy Detector." For the purpose of this invention, however, it will be understood that other suitable such photo-detector or infrared radiation detector elements could be employed. The photosensitive element 12 has two output leads 13 and 14. The detector assembly 10 is fixedly mounted on a housing assembly 20. This housing assembly 20 includes a frusto conical shaped black body reference surface 21 which defines a small circular opening 22 at one end and a large circular opening 23 at the opposite end. The outer members of housing 20 are made of a thermal insulation material to reduce radiation outside the black body reference surface 21. The frusto conical black body surface 21 is relatively rough as shown in FIGS. 2 and 3 and defines the inner surface of a relatively thin frusto conical member 24. The member 24 is relatively thin and is preferably made of a good thermal conductor. A recess 25 is employed to receive the windings 41 and 42 of the thermal control system 40.

Located outwardly of the large circular aperture 23 and co-axial with conical member 24 is a circular surface or flange 26. A collimator lens assembly 30 includes a collimator lens 31 which is fixedly mounted on the circular flange 26 co-axial with the apertures 22 and 23 as well as the lens 11 and detector element 12. A suitable thermal insulator retainer 32 having a circular opening smaller than the diameter of the lens 31 but larger than the diameter of aperture 23 can be employed by fixedly securing the retainer 32 to housing 20 as shown in FIG. 3.

Another frusto conical member 27 is employed which with conical member 24 defines a conical recess 25 and proves electromagnetic shielding of windings 41 and 42 of thermal control system 40 mounted in recess 25. The mounting assembly 50 is employed to fixedly mount all the above described elements. As shown in FIG. 3, an upper mounting post 51 is employed which extends downwardly through a circular aperture 28 in housing 20 and into abutment with the outer surface of conical member 27. A similar circular aperture 29 co-axial with aperture 28 is located in the housing 20 for receiving an upwardly extending hollow mounting post 52 which also comes into an abutting relationship with the outer surface of conical member 27. Some suitable means such as a screw in housing 20 is employed to fix posts 51 and 52 with respect to housing 20. Posts 51 and 52 are fixed with respect to each other and are preferably mounted on the same frame.

Post 51 has a co-axial circular flange portion 53. Post 52 likewise has a similar circular flange portion 54 which extends outwardly therefrom. A suitable circular ballbearing member 55 is employed between flange member 53 and the chopper assembly 60. Likewise, a suitable circular ballbearing member 56 is employed between flange member 54 and chopper assembly 60. Bearing member 55 is mounted on post 51 and bearing member 56 is mounted around member 52. These ballbearing members provide for free-rotation of the chopper assembly 60 about its rotary axis $A_c$ defined by the co-axial mounting pins or posts 51 and 52.

The chopper assembly 60 includes a lower dish-shaped base member 61 having a circular aperture 62 for receiving mounting pin 52. A circularly disposed flange member 63 extends downwardly from the base member 61. The flange member 63 has an inner diameter slightly larger than the outer diameter of the bearing member 56, and is co-axial with the axis $A_c$. The diameter of aperture 62 is slightly less than the diameter of the outer race 56a so as to provide a supporting surface for the base member 61 solely on the outer race 56a of bearing 56. This provides free-rotation of the base member 61 and the chopper assembly 60 about mounting pin 52. The mounting assembly 60 also includes an upper dish-shaped concave base member 64 having a circular aperture 65 therein having a diameter slightly less than the outer race 55a of bearing 55. A circular flange 66 extends upwardly from the base member 64 and has an inner diameter slightly larger than the outer diameter of race 55a. Thus, by this mounting or other suitable mounting, the chopper assembly 60 is rotatably mounted about the axis $A_c$. The lower dish-member 61 has secured thereto a gear 67, shown in FIGS. 1 and 3, which is fixedly mounted on the base member 61 and is co-axial with pins 51 and 52. As shown in FIG. 1, gear 67 is arranged to be driven by drive means 80 having a motor 81, a motor shaft 82 and a driving gear 83 fixed to said shaft. The gear 83 engages the gear 67 so motor 81 can effect driving of the chopper assembly 60 at a predetermined rotary speed.

The chopper assembly 60 includes a shutter assembly 70 which is fixedly secured to and rotatable with the lower base member 61 and the upper base member 64. As shown in FIGS. 1, 2, and 3, this shutter assembly 70 includes a first shutter member 71 and a second shutter member 72. As shown in FIG. 2, these shutter members define 90° of a sphere with inner spherical reflecting surfaces having a center of curvature located at $C_c$. As shown in FIGS. 2 and 3, this center of curvature of this reflecting surface is located on the axis $A_c$, the axis of the collimator lens 31, the axis of the aplanatic lens 11 as well as the photoelement 12 and conical black body reference surface 21. More specifically, the shutter element 71 provides an inner spherical concave reflecting surface 73 which is identical in size and shape to the spherical concave reflecting surface 74 of shutter element 72. The reflecting surface 73 is defined by two longitudinal disposed edges 75 and 76 of element 71. The reflecting surface 74 likewise is defined by edges 77 and 78 of element 72, which are in longitudinal disposition with respect to the center of curvature $C_c$. Likewise, edges 75 and 76 are in longitudinal disposition with respect to the center of curvature $C_c$. The edge 76 and the edge 77 are diametrically disposed; that is they define a plane with the center of curvature $C_c$. Likewise edges 75 and 78 define a second plane with $C_c$ which is perpendicular to the first plane defined by edges 76 and 77. As shown clearly in FIG. 3, the upper edges of shutter elements 71 and 72 are secured to the base member 64 whereas the lower edges of shutter elements 71 and 72 are secured to lower base member 61, these connections being located in horizontal planes.

The above described edges 75 through 78, define reflecting surfaces 73 and 74. In addition, edge 75 and edge 77 define a 90° opening or aperture 79 in the assembly 60 whereas edge 76 and edge 78 define another 90° aperture 79a in the assembly. Apertures 79 and 79a provide polar openings for transmission of radiation and have the same size, shape and width as the reflecting surfaces 73 and 74. These openings are defined at the upper and lower ends between lower and upper edges of base members 64 and 61 respectively. Hence, as can be viewed in FIG. 2, rotation of the chopper assembly 60 at a constant speed, will result in equal alternating time periods during which the detector 12 is exposed to radiation through either opening 79 or 79a, lens 31, 11 and element 12 and periods during which radiation is reflected from black body surface 21 through lens 31 off either surface 73 or 74 and back to element 12.

The embodiment of the invention illustrated in the drawings utilizing the assembly 10 of the above described co-pending application, has particular utility in detecting infrared radiation. Thus the reflecting surfaces 73 and 74 are coated or made of gold which is a relatively high efficiency reflector of infrared rays.

The conical shield member 27 and conical member 24 define a recess 25 which contains some suitable thermal regulator. In the present embodiment, a temperature regulator 40 is employed having temperature sensitive windings 41 and heater windings 42 which are alternately wound about the thin conical member 24. That is as shown in FIGS. 2 and 3, every other winding is a temperature sensitive winding 41 whereas spaced therebetween are heater windings 42. A current supply 43 is fed to a conventional current regulator 44. The output of the temperature sensing windings 41 regulate the amount of current in heating coils 42 from the current supply 43. Thus as in any conventional temperature regulator, when the temperature of the conical member 24 increases the current applied to the heating coils 42 will decrease. Likewise if the temperature sensing coils 41 tends to decrease the current from supply 43 to heater coils 42 will increase. In this conventional fashion, the temperature of the black body surface 21 can be held relatively constant by way of coils 41 and 42 which are wound about the thin conical member 24. Thus the infrared radiation of this black body reference is accurately determined.

The output terminals 45 of coil 41 can be brought through a suitable aperture in member 27 and thence through the hollow post 52 and outwardly therefrom as shown in FIG. 3. The output leads 13 and 14 likewise can be brought through a suitable aperture in housing 20 through hollow mounting pin 53 and outwardly therefrom as shown in FIGS. 2 and 3. For simplicity, however, these leads are not so shown.

Collimator lens 31 is employed (as described in the above co-pending application) so as to focus rays toward the infrared aplanatic lens 11 and thence to the infrared detector element 12. The lens 31 will focus the rays both from an external infrared source and from the black body surface as reflected off the shutter surfaces 73 or 74. The infrared rays reaching the lens 31 and parallel to the axis ($A_L$) of lens 31, lens 11 and detector 12 will be focused into the center of infrared detector element 12. In addition, rays reaching this lens at a predetermined angle, dependent on the field of view of the lens system will also pass through the lens 31, lens 11 and thence to one side or the other of the infrared detector element 12. Since this angle can be and is in this embodiment very small, only the radiation rays which are parallel to the axis of lens 31 and lens 11 (as axis $A_L$) will be discussed. The other rays which reach detector 12 will deviate only slightly from the parallel rays.

The center of curvature $C_c$ of the spherical surfaces 73 and 74 is positioned on the axis of rotation $A_c$ of chopper assembly 60. Normally the focal point of the spherical surfaces 73 and 74 would be half the distance between the center of the curvature $C_c$ and the surfaces 73 or 74. In the present embodiment, however, due to the refraction of lens 31, this point, $F_s$, falls in the middle of lens 31, near the principal plane of the lens, as illustrated in FIG. 2. In addition, the focal point $F_s$ is on the axis $A_L$ of lenses 31 and 11 and being so positioned, enables a maximum reflection from the black body surface 21 while providing a compact positioning for the shutters 71 and 72. The center of curvature $C_c$ also falls on the lens axis $A_L$ at its innersection with the rotary axis $A_c$.

During the period in which either opening 79 or 79a exposes the detector 12 to external infrared radiation, the parallel rays discussed above form a frusto conical type configuration between the lenses 31 and 11 and terminate at the detector 12. Two rays on the outer extremities of the above frusto conical pattern are illustrated in FIG. 2 as rays $r_1$ and $r_2$. Rays between these two rays or circumferentially disposed therewith, will also reach the detector 12 through lens 11. This is described in more detail in the above co-pending application.

Since the center of curvature $C_c$ is on the axis of rotation $A_c$ and on the lens axis $A_L$, the reflecting surfaces 73 and 74 will have a constant relationship with lenses 31 and 11, regardless of the position of rotation of the shutters. FIG. 2 illustrates the shutter completely closed. During such a period, infrared radiation will occur between the black body surface 21 through lens 31 reflecting off the concave surface 73 and back to detector 12. The focal point $F_s$ is on the lens axis $A_L$ and all radiation from surface 21 passing through $F_s$ will be reflected off surfaces 73 or 74 so as to enter lens 31 parallel to the lens axis $A_L$. As a result, these rays will enter into lens 31 and lens 11, detector 12 in the same frusto conical pattern as external infrared radiation. Such reflected rays are illustrated in FIG. 2 as $R_1$ and $R_2$. As shown in this view, both of these rays pass through the focal point $F_s$, one emanating from near the large opening 23 and the other emanating near the small opening 22. As shown, both of these rays pass through lens 31 and after being reflected by surface 73 enter lens 31 parallel to the lens axis $A_L$. Entering lens 31 parallel to the axis will result in these rays striking detector 12 near the center of detector 12.

As shown in FIG. 2, ray $r_1$ and $r_2$ pass through lens 31, lens 11 and to detector 12 when the shutters 71, 72 are open so that openings 79 and 79a provide external exposure. During the black body reference period, rays $R_1$ and $R_2$ pass through the focal point $F_s$ are refracted, and reflected off surface 73. In the illustration shown in FIG. 2 ray $R_1$ is reflected parallel to axis $A_L$ in a similar path as ray $r_2$ and thence into lens 11 and detector 12. It will be noted that the black body ray $R_2$ after reflection from surface 73 reaches lens 12 at a very small angle to enter detector 11. During the black body period, radiation from this angle from the detector 12 would take the same path as ray $R_2$ but in an opposite direction. Consequently, reflection at this angle from the detector 11 would not be reflected back on itself during a black body period. It will be noted that this angle is very small but still there is no reflection back. Consequently, it can be seen that any reflection of the detectors own radiation would be extremely small, particularly when compared to the total black body radiation, due to the configuration of the reflecting surfaces 73 and 74.

As stated above, the invention could be utilized with a detector assembly 10 which may only include an infrared radiation detector such as an infrared photosensitive element similar to detector element 12. These elements are generally of the type utilizing a bias there across having a resistance depending upon the amount of infrared radiation exposure. Thus, for this reason, the detector leads 13 and 14 are shown as connected to a bias source and a detector which are conventional means to measure such a voltage output signal. It will be understood that the lens 11 in the present embodiment is a hyperhemispherical lens which will transmit infrared radiation similar to that discussed in the patent application.

FIG. 5 illustrates a voltage output from the detector element 12 plotted against time as chopper assembly 60 rotates. As shown in this diagram, the external infrared exposures provide the valleys in the voltage where as the black body reflections provides the peaks of this D-C voltage with the black body at say 70 degrees Fahrenheit. Thus the voltage difference $E_1$ between the black body reference voltage peaks and the external infrared valleys can be an absolute measure of the external infrared radiation or thermal temperature.

Although the invention has been described and illustrated in detail, it is to be clearly understood that this is by way of illustration and example only with the spirit and scope of the invention being limited only by the terms of the appended claims.

I claim:

1. A radiometer comprising a radiation detector element, a cavity having a black body reference surface disposed in the wall of the inner portion of said cavity, said radiation detector element being located on one side of said cavity for receiving rays therethrough, and a chopper comprising a concave reflecting surface rotatably mounted for movement across the opposite side of said cavity to alternately provide a concave reflecting surface for radiation emitted by said reference surface and an opening for receiving rays from an external source of radiation, ray directing means comprising said concave reflecting surface, said ray directing means focused to reflect substantially only said black body reference surface disposed in the inner portion of the wall of said cavity, upon said radiation detector.

2. A radiometer comprising a cavity having an internal wall comprising a conical black body reference surface defining at one end a relatively small circular opening and at the opposite end a relatively large circular opening, a radiation detector element located within said small opening for receiving rays through said cavity, a collimator lens located in said large opening for directing rays toward said detector element, and a chopper assembly comprising a concave spherical reflecting surface, said lens being located between said reflecting surface and said detector element, said reflecting surface being rotatably mounted for movement in front of said lens in such a manner as to alternately expose said detector element to external radiation and to rays reflected from said black body reference surface, said spherical reflecting surface and said lens focused to reflect the interior of said conical black body upon said detector element and substantially exclude rays from said detector element from being reflected back upon itself.

3. A radiometer comprising a cavity having a conical black body reference surface defining at one end a relatively small circular opening and at the opposite end a relatively large circular opening, a radiation detector element located within said small opening for receiving rays through said cavity, a collimator lens located in said large opening for directing rays toward said detector element, and a chopper assembly comprising a concave spherical reflecting surface, said lens being located within said chopper assembly, said reflecting surface being rotatably mounted for movement in front of said lens in such a manner as to alternately expose said detector element to external radiation and to rays reflected from said black body reference surface, and wherein the center of curvature of said spherical reflecting surface is located between said lens and said detector element.

4. A radiometer comprising a cavity having a conical black body reference surface defining at one end a relatively small circular opening and at the opposite end a relatively large circular opening, a radiation detector element located within said small opening for receiving rays through said cavity, a collimator lens located in said large opening for directing rays toward said detector element, and a chopper assembly comprising a concave spherical reflecting surface, said lens being located within said chopper assembly, said reflecting surface being rotatably mounted for movement in front of said lens in such a manner as to alternately expose said detector element to external radiation and to rays reflected from said black body reference surface, and wherein the effective focal point of said reflecting surface is positioned substantially on the surface of said lens nearest said detector element.

References Cited

UNITED STATES PATENTS 2,929,293  3/1960  Willey _____ 250—236 X
3,097,300  7/1963  Wormser et al. _____ 250—83.3

ARCHIE R. BORCHELT, *Primary Examiner.*

RODNEY D. BENNETT, CHESTER C. JUSTUS,
*Examiners.*

C. E. WANDS, *Assistant Examiner.*